(No Model.)

C. HALL.
ANIMAL TRAP.

No. 309,781. Patented Dec. 23, 1884.

WITNESSES:
Fred. G. Dieterich
Wth. Fechter

INVENTOR.
Chas. Hall
by Louis Bagger & Co.
ATTORNEYS.

N. PETERS. Photo-Lithographer, Washington, D. C.

UNITED STATES PATENT OFFICE.

CHARLES HALL, OF CHANGEWATER, NEW JERSEY, ASSIGNOR OF ONE-HALF TO THEODORE ANDERSON, OF SAME PLACE.

ANIMAL-TRAP.

SPECIFICATION forming part of Letters Patent No. 309,781, dated December 23, 1884.

Application filed June 16, 1884. (No model.)

*To all whom it may concern:*

Be it known that I, CHARLES HALL, a citizen of the United States and a resident of Changewater, in the county of Warren and State of New Jersey, have invented certain new and useful Improvements in Animal-Traps; and I do hereby declare that the following is a full, clear, and exact description of the invention, which will enable others skilled in the art to which it appertains to make and use the same, reference being had to the accompanying drawings, which form a part of this specification, and in which—

Figure 1:
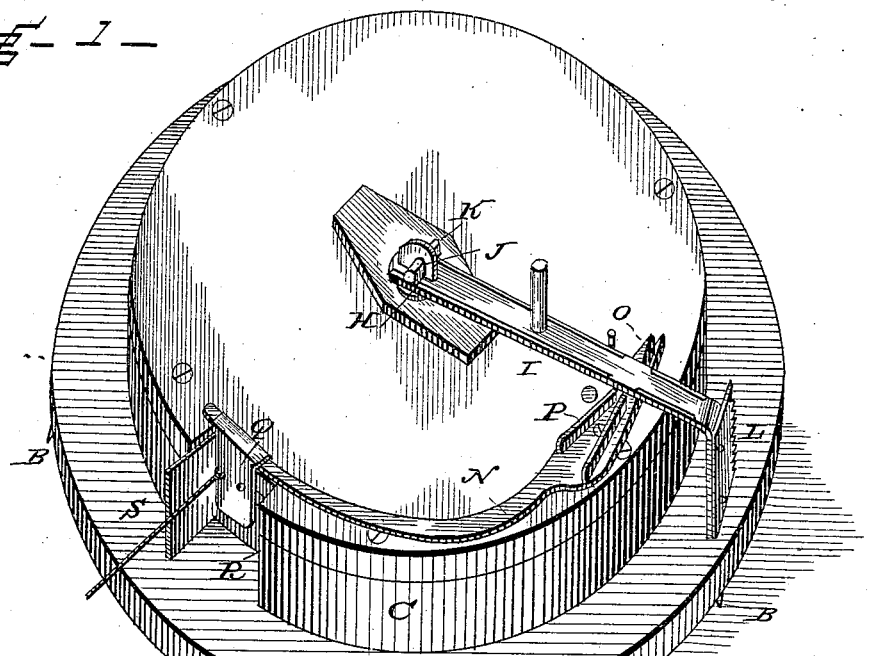
Figure 3:
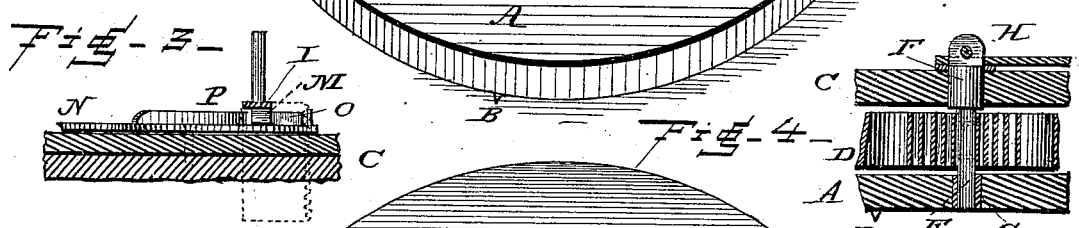
Figure 4:
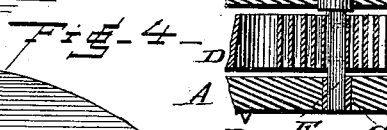
Figure 2:
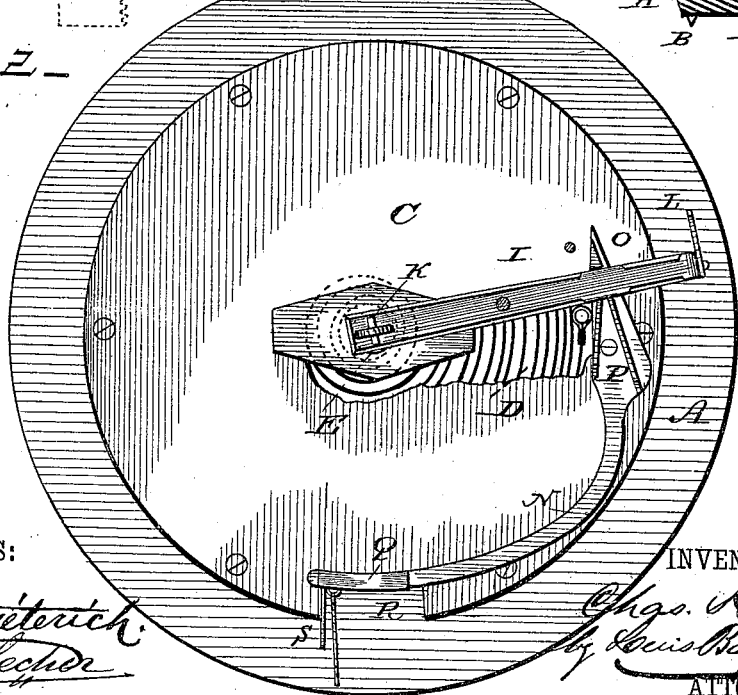

Figure 1 is a perspective view of my improved animal-trap. Fig. 2 is a top view of the same, and Fig. 3 is a detail view; and Fig. 4 is a sectional detail view of the box, the helical spring, and the central shaft.

Similar letters of reference indicate corresponding parts in all the figures.

My invention has relation to that class of animal-traps in which the animal is struck by a hammer or sharp instrument when it touches the bait; and it consists in the improved construction and combination of parts of the same, as hereinafter more fully described and claimed.

In the accompanying drawings, the letter A indicates the base of the trap, which is preferably provided with a number of downwardly-projecting pins or points, B, which serve to hold the trap in place upon the floor, shelf, or other place where it may be placed, the points being slightly forced into the support. A round box, C, is secured upon the base, forming a low cylinder, and a helical spring, D, is secured at its outer end to the inside of the box, and at its inner end to a short shaft, E, the ends of which turn in bushings or bearings F and G in the top of the box or case and in the base. The upper end of this shaft is preferably flattened and perforated, as shown at H, and an arm, I, having a longitudinal slot, J, in its inner end is secured upon the said reduced end by means of a key, K, and has its outer end bent downward and provided with a sharp-toothed plate, L, or with a hammer, sharp metallic point, or other instrument suitable for killing an animal struck by it. The upper side of the arm is provided with a suitable handle for turning it in a circle, winding the spring, and the under side of the arm is provided near its outer end with a downwardly-projecting lug, M, and a lever, N, is pivoted upon the top of the spring-case, and has at the end of its shorter arm an upwardly-projecting pointed lug, O, and two ribs, P, a short distance inside the pointed lug, which ribs converge toward the point, forming contracting ways. The longer curved arm of the lever is provided at its end with a downwardly-projecting plate, Q, to which the bait is secured, and which plate fits and projects into a recess, R, in the periphery of the spring-case, one side of which is provided with an outwardly-projecting plate or shield, S. It will now be seen that the arm may be turned in a circle, winding the spring, whereupon it may be held in its wound position by the lug upon the under side of the arm engaging the pointed lug upon the end of the curved lever, and an animal nibbling or biting at the bait will draw the curved end of the lever outward, which will cause the pointed lug to be forced inward, releasing the arm, which will fly around and strike the animal at the bait, killing it and removing it from the bait, and on reaching the converging ways upon the short arm of the lever the lug upon the under side of the arm will move the lever into position, the pointed lug stopping the lug with its broad end and holding the arm ready for another animal to draw at the bait. In this manner the trap may be wound and be set to kill several animals, the arm setting itself after each time it is released as long a time as the spring is still wound. When the arm is wound and the trap is not to be used, a stop or cushion may be placed at the baiting-plate for the purpose of stopping the arm and preventing it from striking the lug upon the end of the lever so hard as to break it.

Having thus described my invention, I claim and desire to secure by Letters Patent of the United States—

1. The combination, in an animal-trap, of an arm having a killing implement upon its outer end, provided with a lug upon its under side, and pivoted at its inner end to swing in a circle, a trigger pivoted under the arm, having an upwardly-projecting lug upon the end of its shorter arm and converging ways a short distance to the rear of the lug adapted to engage the lug upon the arm, and provided with a bait-holding plate at the end of its long arm, and means, substantially as described, for forcing the arm to swing in a circle, as and for the purpose shown and set forth.

2. The combination, in an animal-trap, of a circular or flat cylindrical box or spring-case having a recess in its periphery, and formed with vertical central bearings in its top and bottom, a shaft pivoted in the said bearings, a helical spring secured to the inner side of the spring-case and to the shaft, an arm secured to the upper end of the shaft, having its outer end bent downward and provided with a killing implement at its outer end, having an upwardly-projecting handle and a downwardly-projecting lug near its outer end, and a curved lever pivoted upon the top of the spring-case near to its periphery, and provided upon its short arm with a pointed lug at the end and with two converging ribs or ways a short distance inside the lug, and provided upon its long arm with a bait-receiving plate, as and for the purpose shown and set forth.

In testimony that I claim the foregoing as my own I have hereunto affixed my signature in presence of two witnesses.

CHARLES HALL. [L. S.]

Witnesses:
OSCAR JEFFERY,
F. M. NEHLEIN.